US009692095B2

(12) United States Patent
Harris

(10) Patent No.: US 9,692,095 B2
(45) **Date of Patent: *Jun. 27, 2017**

(54) FULLY-SUBMERGED BATTERY CELLS FOR VEHICLE ENERGY-STORAGE SYSTEMS

(71) Applicant: Faraday&Future Inc., Gardena, CA (US)

(72) Inventor: W. Porter Harris, Los Angeles, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 14/929,245

(22) Filed: Oct. 30, 2015

(65) Prior Publication Data

US 2017/0005381 A1 Jan. 5, 2017

Related U.S. Application Data

(63) Continuation-in-part of application No. 14/866,907, filed on Sep. 26, 2015.

(Continued)

(51) Int. Cl.
*H01M 10/6556* (2014.01)
*H01M 2/02* (2006.01)
(Continued)

(52) U.S. Cl.
CPC ..... *H01M 10/6556* (2015.04); *H01M 2/0277* (2013.01); *H01M 2/0292* (2013.01);
(Continued)

(58) Field of Classification Search
CPC ......... H01M 10/6556; H01M 10/0525; H01M 10/613
See application file for complete search history.

(56) References Cited

U.S. PATENT DOCUMENTS 5,879,833 A 3/1999 Yoshii et al.
8,057,928 B2 11/2011 Kohn et al.
(Continued)

FOREIGN PATENT DOCUMENTS

EP 2270918 1/2011
EP 2482362 8/2012
(Continued)

OTHER PUBLICATIONS

Written Opinion in International Application No. PCT/US2016/039884, mailed Oct. 19, 2016.
(Continued)

*Primary Examiner* — Stewart Fraser
(74) *Attorney, Agent, or Firm* — Knobbe, Martens, Olson & Bear LLP

(57) ABSTRACT

Provided are cooling subsystems for energy-storage systems comprising: a coolant section having a coolant circulated therein; a plurality of battery cells having a coated portion, the coated portion being disposed in the coolant section, the coolant section configured so that the plurality of battery cells are substantially fully covered by the coolant; and a retainer disposed in the coolant section, the retainer holding the plurality of battery cells, the retainer having a plurality of flow channels, the coolant flowing through the flow channels.

15 Claims, 11 Drawing Sheets

Related U.S. Application Data

(60) Provisional application No. 62/186,977, filed on Jun. 30, 2015.

(51) Int. Cl.

| | |
|---|---|
| ***H01M 2/20*** | (2006.01) |
| ***H01M 2/34*** | (2006.01) |
| ***H01M 10/625*** | (2014.01) |
| ***H01M 10/653*** | (2014.01) |
| ***H01M 10/643*** | (2014.01) |
| ***H01M 10/613*** | (2014.01) |
| ***H01M 2/30*** | (2006.01) |
| ***H01M 10/0525*** | (2010.01) |
| *B60L 11/18* | (2006.01) |
| *H01M 2/10* | (2006.01) |

(52) U.S. Cl.

CPC ............. *H01M 2/206* (2013.01); *H01M 2/30* (2013.01); *H01M 2/348* (2013.01); *H01M 10/0525* (2013.01); *H01M 10/613* (2015.04); *H01M 10/625* (2015.04); *H01M 10/643* (2015.04); *H01M 10/653* (2015.04); *B60L 11/1877* (2013.01); *H01M 2/1077* (2013.01); *H01M 2200/103* (2013.01); *H01M 2220/20* (2013.01)

(56) References Cited

U.S. PATENT DOCUMENTS

| | | | |
|---|---|---|---|
| 2001/0046624 | A1 | 11/2001 | Goto et al. |
| 2008/0138698 | A1 | 6/2008 | Ogami et al. |
| 2009/0023059 | A1 | 1/2009 | Kinoshita et al. |
| 2009/0211277 | A1 | 8/2009 | Rummel et al. |
| 2009/0220852 | A1 | 9/2009 | Fujii |
| 2009/0274952 | A1 | 11/2009 | Wood et al. |
| 2009/0297892 | A1 | 12/2009 | Ijaz et al. |
| 2010/0047682 | A1 | 2/2010 | Houchin-Miller et al. |
| 2010/0285346 | A1* | 11/2010 | Graban ............... H01M 2/1077 429/120 |
| 2011/0045334 | A1 | 2/2011 | Meintschel et al. |
| 2011/0059346 | A1 | 3/2011 | Jeong et al. |
| 2011/0097617 | A1 | 4/2011 | Gu et al. |
| 2011/0135975 | A1 | 6/2011 | Fuhr et al. |
| 2012/0177970 | A1 | 7/2012 | Marchio et al. |
| 2012/0177971 | A1 | 7/2012 | Cicero et al. |
| 2012/0183830 | A1 | 7/2012 | Schaefer et al. |
| 2013/0157102 | A1 | 6/2013 | Nagamatsu et al. |
| 2013/0306353 | A1 | 11/2013 | Zhao |
| 2013/0344362 | A1 | 12/2013 | Raisch et al. |
| 2014/0335381 | A1 | 11/2014 | Krolak |
| 2015/0188203 | A1 | 7/2015 | Enomoto et al. |
| 2015/0194713 | A1 | 7/2015 | Jin et al. |
| 2016/0172727 | A1 | 6/2016 | Chan et al. |

FOREIGN PATENT DOCUMENTS

| | | |
|---|---|---|
| EP | 2738833 | 6/2014 |
| WO | WO 2007/047317 | 4/2007 |
| WO | WO 2008/109764 | 9/2008 |
| WO | WO 2011/149868 | 12/2011 |
| WO | WO 2013/056877 | 4/2013 |
| WO | WO 2013/155700 | 10/2013 |
| WO | WO 2015/041149 | 3/2015 |

OTHER PUBLICATIONS

Written Opinion in International Application No. PCT/US2015/068134, mailed Apr. 12, 2016.

Written Opinion in International Application No. PCT/US2015/068141, mailed Apr. 8, 2016.

* cited by examiner

FULLY-SUBMERGED BATTERY CELLS FOR VEHICLE ENERGY-STORAGE SYSTEMS

CROSS-REFERENCE TO RELATED APPLICATIONS

This application is a continuation-in-part of U.S. patent application Ser. No. 14/866,907 filed Sep. 26, 2015, which claims the benefit of U.S. Provisional Application No. 62/186,977 filed Jun. 30, 2015. This application is related to U.S. patent application Ser. No. 14/841,617 filed Aug. 31, 2015. The subject matter of the aforementioned applications is incorporated herein by reference for all purposes.

FIELD

The present application relates generally to energy-storage systems, and more specifically to energy storage systems for vehicles.

BACKGROUND

It should not be assumed that any of the approaches described in this section qualify as prior art merely by virtue of their inclusion in this section.

Electric-drive vehicles offer a solution for reducing the impact of fossil-fuel engines on the environment and transforming automotive mobility into a sustainable mode of transportation. Energy-storage systems are essential for electric-drive vehicles, such as hybrid electric vehicles, plug-in hybrid electric vehicles, and all-electric vehicles. However, present energy-storage systems have disadvantages including large size, inefficiency, and poor safety, to name a few. Similar to many sophisticated electrical systems, heat in automotive energy-storage systems should be carefully managed. Current thermal management schemes consume an inordinate amount of space. Present energy-storage systems also suffer from inefficiencies arising variously from imbalance among battery cells and resistance in various electrical connections. In addition, current energy-storage systems are not adequately protected from forces such as crash forces encountered during a collision.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to various embodiments, the present disclosure may be directed to cooling subsystems comprising: a coolant section having a coolant circulated therein; a plurality of battery cells having a coated portion, the coated portion being disposed in the coolant section, the coolant section configured so that the plurality of battery cells are substantially fully covered by the coolant; and a retainer disposed in the coolant section, the retainer holding the plurality of battery cells, the retainer having a plurality of flow channels, the coolant flowing through the flow channels.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
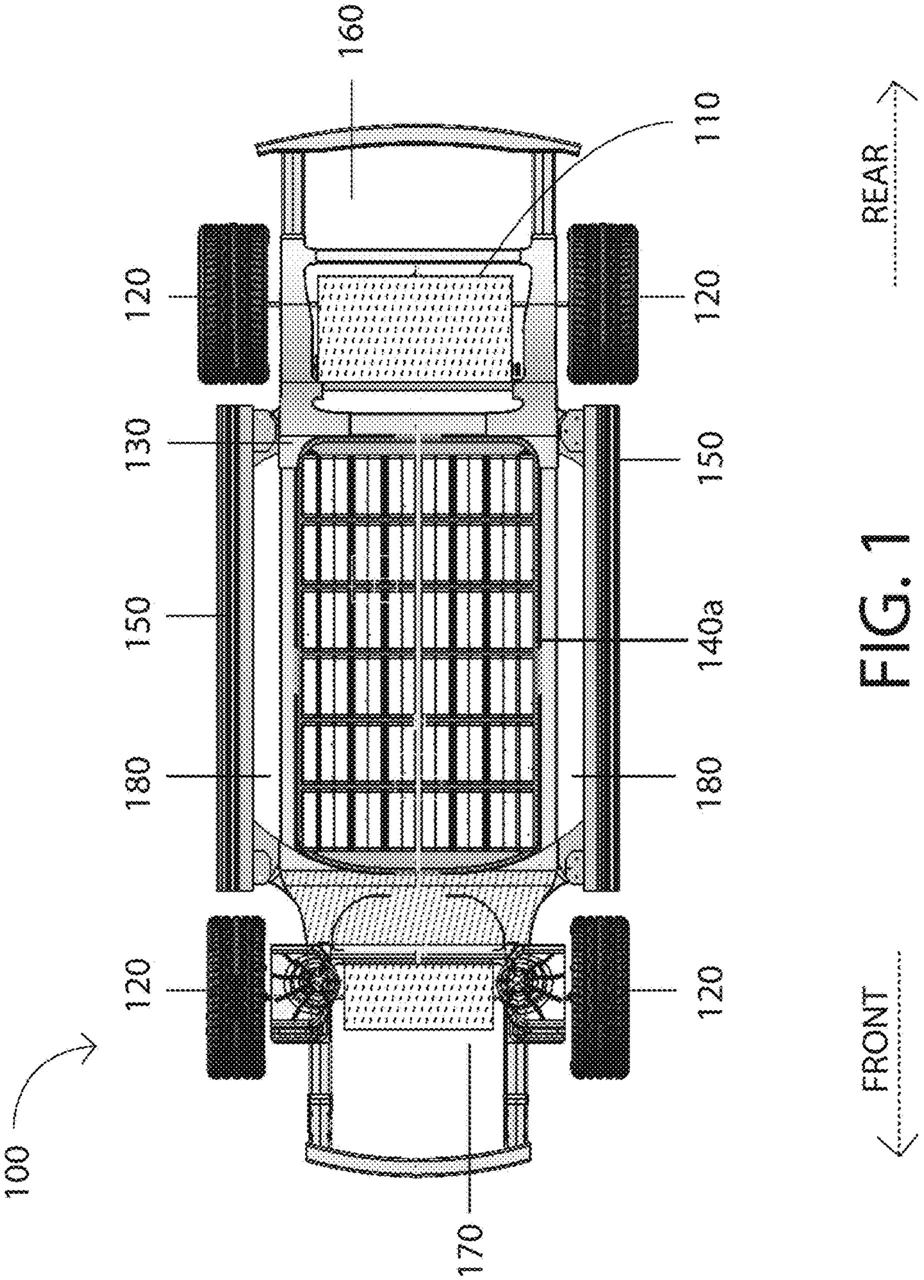
FIG. 1 illustrates an example environment in which an energy-storage system can be used.

While this disclosure is susceptible of embodiment in many different forms, there are shown in the drawings and will herein be described in detail several specific embodiments with the understanding that the present disclosure is to be considered as an exemplification of the principles of the disclosure and is not intended to limit the disclosure to the embodiments illustrated. The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

Some embodiments of the present disclosure can be deployed in a wheeled, self-powered motor vehicle used for transportation, such as hybrid electric vehicles, plug-in hybrid electric vehicles, and all-electric vehicles. For example, FIG. 1 illustrates electric car 100. Electric car 100 can be an automobile propelled by one or more electric motors 110. Electric motor 110 can be coupled to one or more wheels 120 through a drivetrain (not shown in FIG. 1). Electric car 100 can include frame 130 (also known as an underbody or chassis). Frame 130 can be a supporting structure of electric car 100 to which other components can be attached/mounted, such as, for example, a battery pack 140*a*. Battery pack 140*a* can supply electricity to power one or more electric motors 110, for example, through an inverter. The inverter can change direct current (DC) from battery pack 140*a* to alternating current (AC), as can be required for electric motors 110, according to some embodiments.

As depicted in FIG. 1, battery pack 140*a* may have a compact "footprint" and be at least partially enclosed by frame 130 and disposed to provide a predefined separation, for example, from structural rails 150 of an upper body that couples to frame 130. Accordingly, at least one of rear crumple zone 160, front crumple zone 170, and lateral crumple zone 180 can be formed around battery pack 140*a*. Both the frame 130 and structural rails 150 may protect battery pack 140*a* from forces or impacts exerted from outside of electric car 100, for example, in a collision. In contrast, other battery packs which extend past at least one of structural rails 150, rear crumple zone 160, and front crumple zone 170 remain vulnerable to damage and may even explode in an impact.

Battery pack 140*a* may have a compact "footprint" such that it may be flexibly used in and disposed on frame 130 having different dimensions. Battery pack 140*a* can also be disposed in frame 130 to help improve directional stability (e.g., yaw acceleration). For example, battery pack 140*a* can be disposed in frame 130 such that a center of gravity of electric car 100 is in front of the center of the wheelbase (e.g., bounded by a plurality of wheels 120).

Figure 2A:
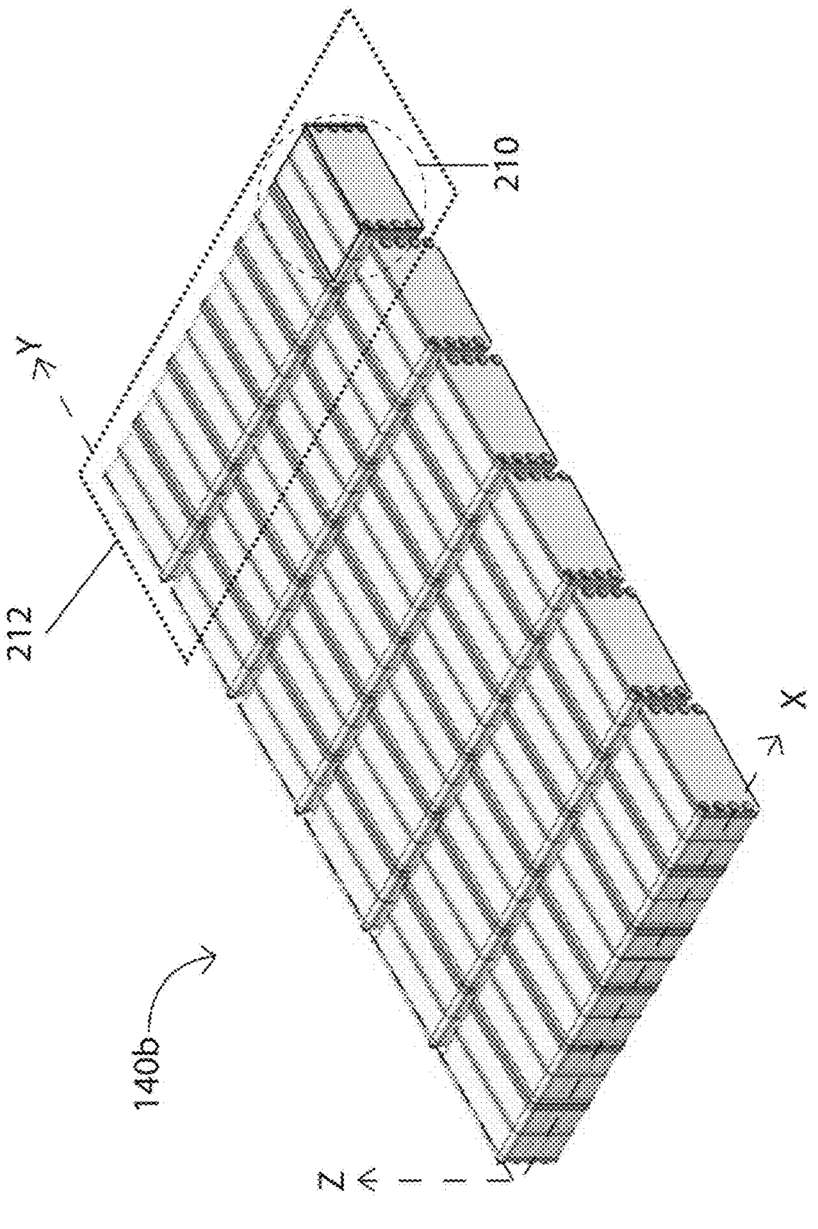
FIG. 2A shows an orientation of battery modules in an energy-storage system, according to various embodiments of the present disclosure.

FIG. 2A shows battery pack 140*b* with imaginary x-, y-, and z-axis superimposed, according to various embodiments. Battery pack 140*b* can include a plurality of battery modules 210. In a non-limiting example, battery pack 140*b* can be approximately 1000 mm wide (along x-axis), 1798 mm long (along y-axis), and 152 mm high (along z-axis), and can include thirty-six of battery modules 210.

Figure 2B:
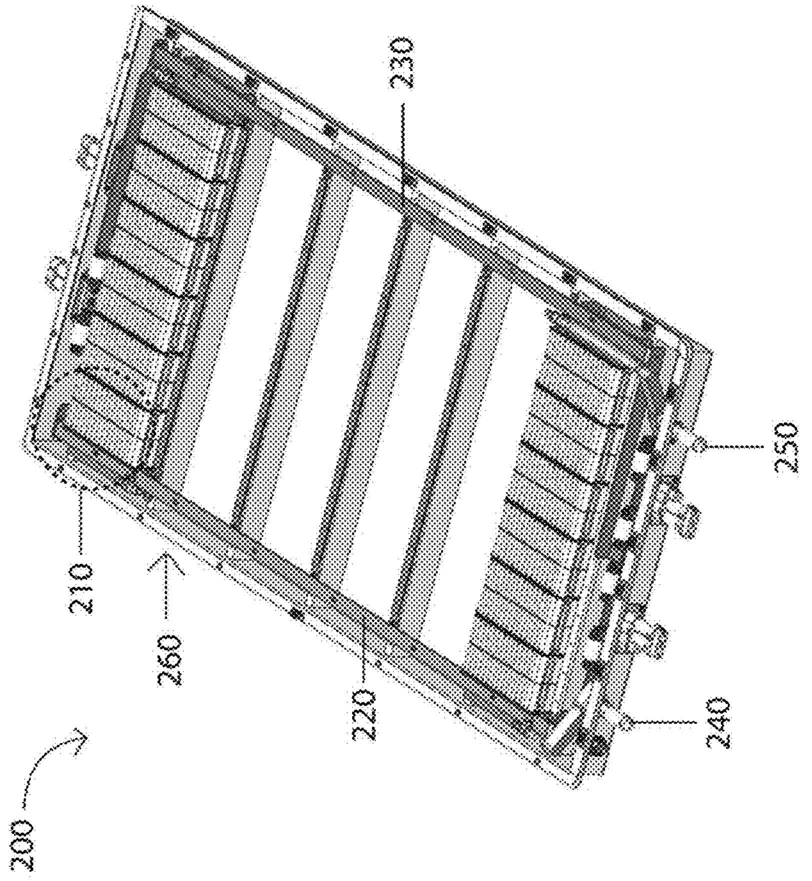
FIG. 2B depicts a bottom part of an enclosure of a partial battery pack such as shown in FIG. 2A.

FIG. 2B illustrates exemplary enclosure 200 for battery pack 140*b* having a cover removed for illustrative purposes. Enclosure 200 includes tray 260 and a plurality of battery modules 210. Tray 260 may include positive bus bar 220 and negative bus bar 230. Positive bus bar 220 can be electrically coupled to a positive (+) portion of a power connector of each battery module 210. Negative bus bar 230 can be electrically coupled to a negative (−) portion of a power connector of each battery module 210. Positive bus bar 220 can be electrically coupled to positive terminal 240 of enclosure 200. Negative bus bar 230 can be electrically coupled to negative terminal 250 of enclosure 200. As described above with reference to FIG. 1, because bus bars 220 and 230 can be within structural rails 150, they can be protected from collision damage.

According to some embodiments, negative bus bar 230 and positive bus bar 220 can be disposed along opposite edges of tray 260 to provide a predefined separation between negative bus bar 230 and positive bus bar 220. Such separation between negative bus bar 230 and positive bus bar 220 can prevent or at least reduce the possibility of a short circuit (e.g., of battery pack 140*b*) due to a deformity caused by an impact.

As will be described further in more detail with reference to FIG. 5, battery module 210 can include at least one battery cell (details not shown in FIG. 2A, see FIG. 7). The at least one battery cell can include an anode terminal, a cathode terminal, and a cylindrical body. The battery cell can be disposed in each of battery module 210 such that a surface of the anode terminal and a surface of the cathode terminal are normal to the imaginary x-axis referenced in FIG. 2A (e.g., the cylindrical body of the battery cell is parallel to the imaginary x-axis). This can be referred to as an x-axis cell orientation.

In the event of fire and/or explosion in one or more of battery modules 210, the battery cells can be vented along the x-axis, advantageously minimizing a danger and/or a harm to a driver, passenger, cargo, and the like, which may be disposed in electric car 100 above battery pack 140*b* (e.g., along the z-axis), in various embodiments.

The x-axis cell orientation of battery modules 210 in battery pack 140*b* shown in FIGS. 2A and 2B can be advantageous for efficient electrical and fluidic routing to each of battery module 210 in battery pack 140*b*. For example, at least some of battery modules 210 can be electrically connected in a series (forming string 212), and two or more of string 212 can be electrically connected in parallel. This way, in the event one of string 212 fails, others of string 212 may not be affected, according to various embodiments.

Figure 3:
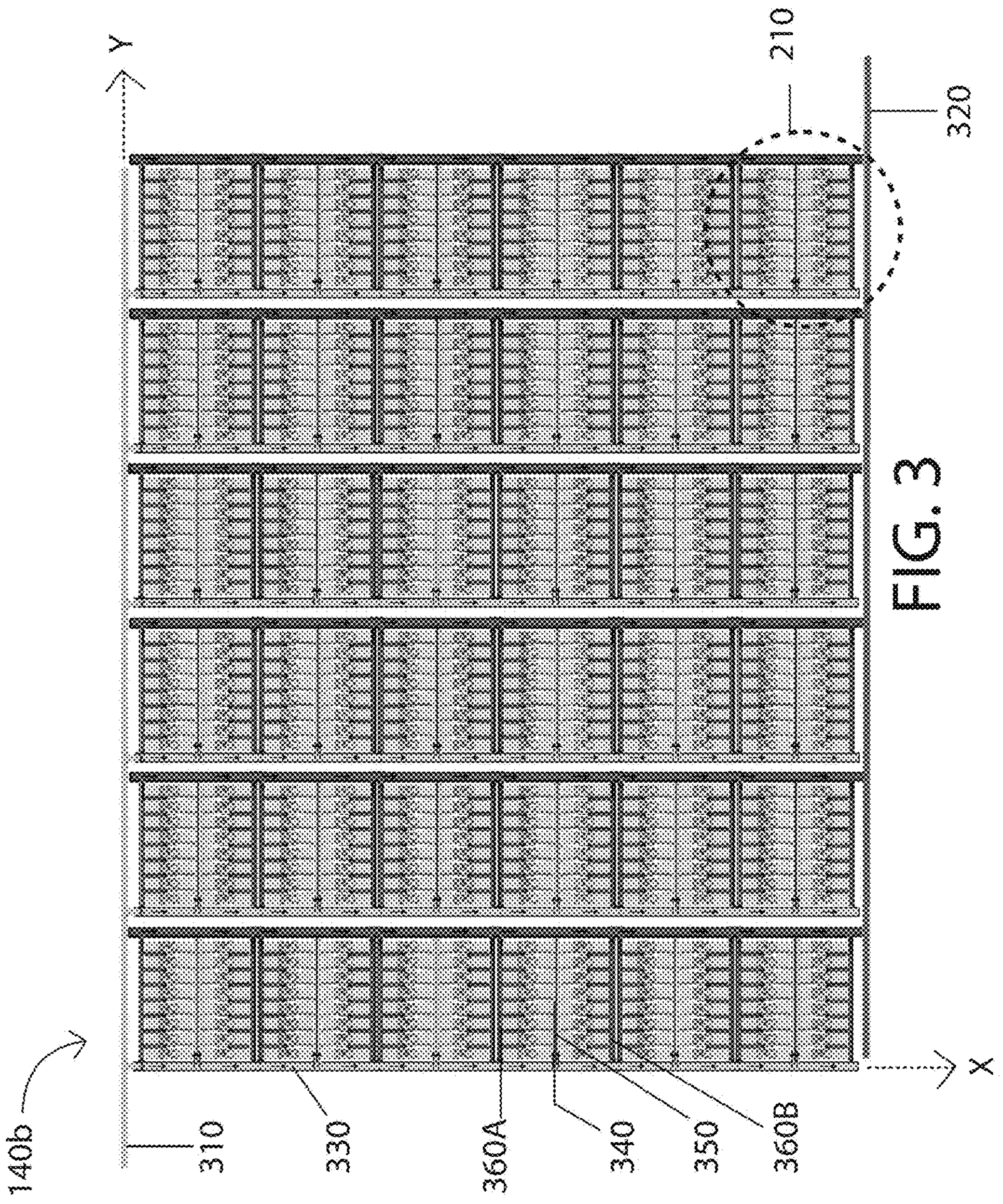
FIG. 3 is a simplified diagram illustrating coolant flows, according to example embodiments.

FIG. 3 illustrates coolant flows and operation of a coolant system and a coolant sub-system according to various embodiments. As shown in FIG. 3, the x-axis cell orientation can be advantageous for routing coolant (cooling fluid) in parallel to each of battery modules 210 in battery pack 140*b*. Coolant can be pumped into battery pack 140*b* at ingress 310 and pumped out of battery pack 140*b* at egress 320. A resulting pressure gradient within battery pack 140*b* can provide sufficient circulation of coolant to minimize a temperature gradient within battery pack 140*b* (e.g., a temperature gradient within one of battery modules 210, a temperature gradient between battery modules 210, and/or a temperature gradient between two or more of strings 212 shown in FIG. 2A).

Within battery pack 140*b*, the coolant system may circulate the coolant, for example, to battery modules 210 (e.g., the circulation is indicated by reference numeral 330). One or more additional pumps (not shown in FIG. 3) can be used to maintain a roughly constant pressure between multiple battery modules 210 connected in series (e.g., in string 212 in FIG. 2A) and between two or more of string 212. Within each battery module 210, the coolant sub-system may circulate the coolant, for example, between and within two half modules 410 and 420 shown in FIG. 4 (e.g., the circulation indicated by reference numeral 340).

In some embodiments, the coolant can enter each battery module 210 through interface 350 between two half modules 410 and 420, in a direction (e.g., along the y- or z-axis) perpendicular to the cylindrical body of each battery cell, and flow to each cell. Driven by pressure within the coolant system, the coolant then can flow along the cylindrical body of each battery (e.g., along the x-axis) and may be collected at two (opposite) side surfaces 360A and 360B of the module that can be normal to the x-axis. In this way, heat can be efficiently managed/dissipated and thermal gradients minimized among all battery cells in battery pack 140*b*, such that a temperature may be maintained at an approximately uniform level.

In some embodiments, parallel cooling, as illustrated in FIG. 3, can maintain temperature among battery cells in battery pack 140*b* at an approximately uniform level such that a direct current internal resistance (DCIR) of each battery cell can be maintained at an substantially predefined resistance. The DCIR can vary with a temperature, therefore, keeping each battery cell in battery pack 140*b* at a substantially uniform and predefined temperature can result in each battery cell having substantially the same DCIR. Since a voltage across each battery cell can be reduced as a function of its respective DCIR, each battery cell in battery pack 140*b* may experience substantially the same loss in voltage. In this way, each battery cell in battery pack 140*b* can be maintained at approximately the same capacity and imbalances between battery cells in battery pack 140*b* can be minimized, improving battery efficiency.

In some embodiments, when compared to techniques using metal tubes to circulate coolant, parallel cooling can enable higher battery cell density within battery module 210 and higher battery module density in battery pack 140*b*. In some embodiments, coolant or cooling fluid may be at least one of the following: synthetic oil, for example, poly-alpha-olefin (or poly-α-olefin, also abbreviated as PAO) oil, ethylene glycol and water, liquid dielectric cooling based on phase change, and the like.

Figure 4:
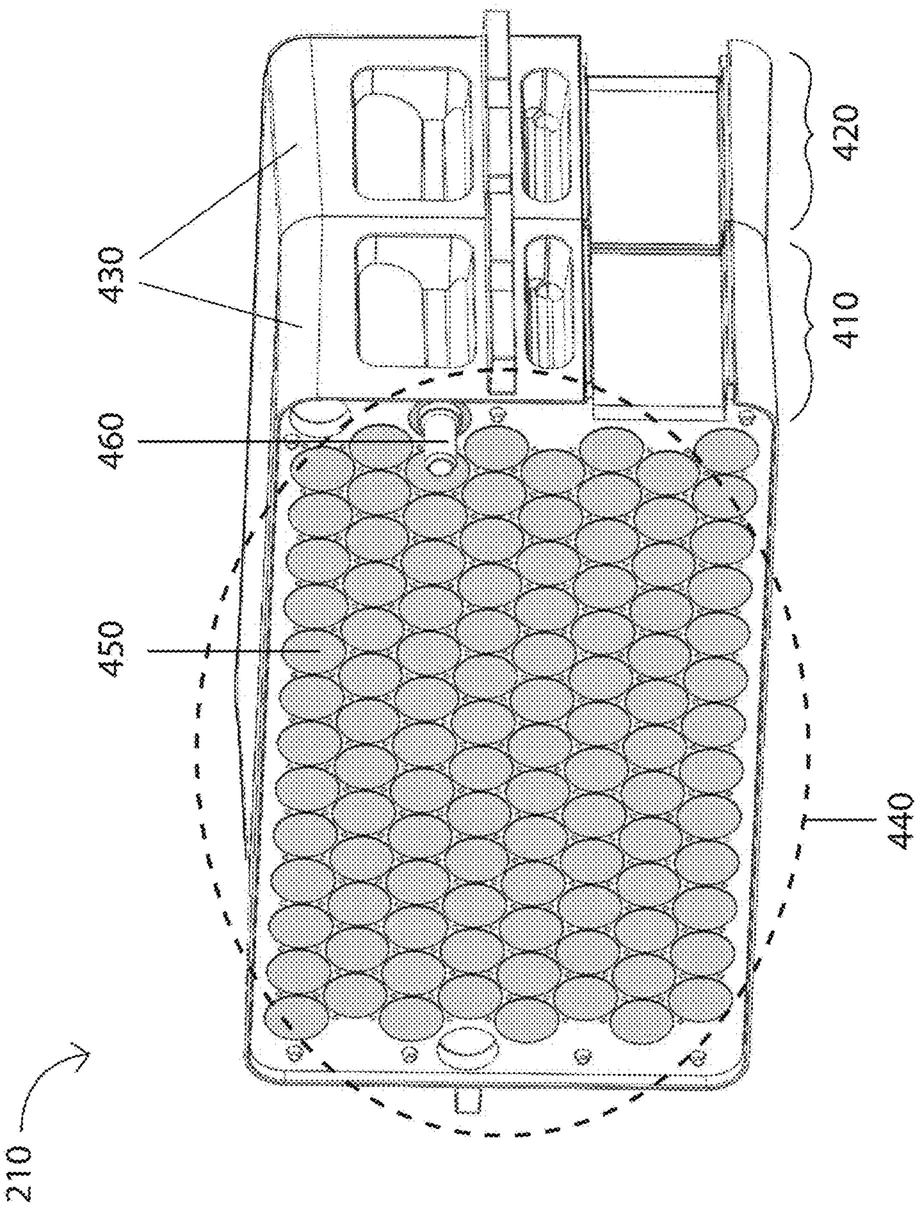
FIG. 4 is a simplified diagram of a battery module, according to various embodiments of the present disclosure.

FIG. 4 illustrates battery module 210 according to various embodiments. Main power connector 460 can provide power from battery cells 450 to outside of battery module 210. Coolant can be provided to battery module 210 at main coolant input port 480, receive/transfer heat from battery module 210, and be received at main coolant output port 470. In some embodiments, battery module 210 can include two half modules 410 and 420, each having respective enclosure 430. Enclosure 430 may be made using one or more plastics having sufficiently low thermal conductivities. Respective enclosures 430 of each of two half modules 410 and 420 may be coupled with each other to form the housing for battery module 210.

FIG. 4 includes view 440 of enclosure 430 (e.g., with a cover removed). For each of half modules 410, 420 there is shown a plurality of battery cells 450 oriented (mounted) horizontally (see also FIGS. 5 and 8). By way of non-limiting example, each half module can include one hundred four of battery cells 450. By way of further non-limiting example, eight of battery cells 450 can be electrically connected in a series (e.g., the staggered column of eight battery cells 450 shown in FIG. 4), with a total of thirteen of such groups of eight battery cells 450 electrically connected in series. By way of additional non-limiting example, the thirteen groups (e.g., staggered columns of eight battery cells 450 electrically coupled in series) can be electrically connected in parallel. This example configuration may be referred to as “8S13P” (8 series, 13 parallel). In some embodiments, the 8S13P electrical connectivity can be provided by current carrier 510, described further below in relation to FIGS. 5 and 6. Other combinations and permutations of battery cells 450 electrically coupled in series and/or parallel may be used.

Figure 5:
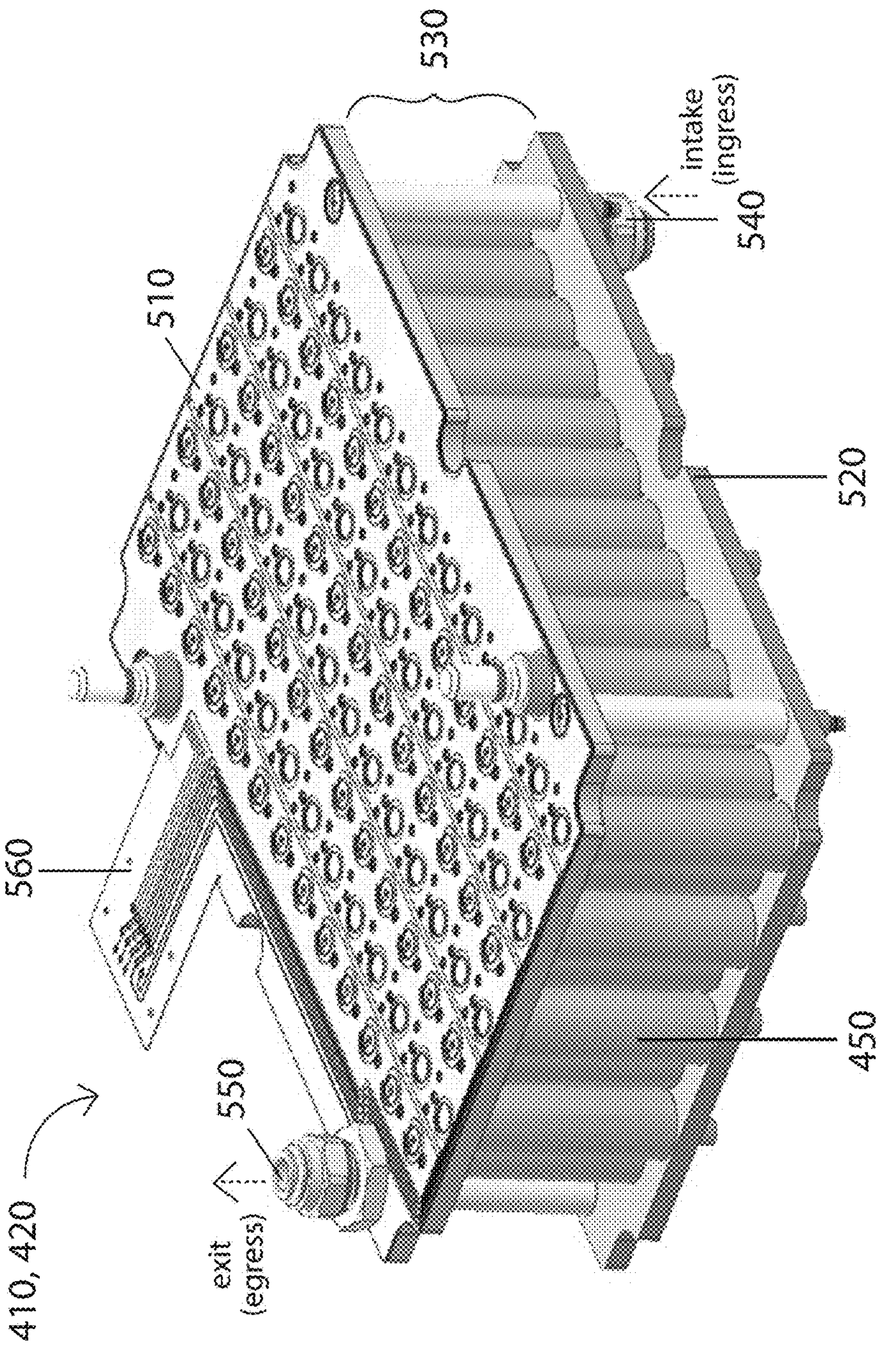
FIG. 5 illustrates a half module, in accordance with various embodiments.

FIG. 5 depicts a view of half modules 410, 420 without enclosure 430 in accordance with various embodiments. Half modules 410 and 420 need not be the same, for example, they may be mirror images of each other in some embodiments. Half modules 410 and 420 can include a plurality of battery cells 450. The plurality of battery cells 450 can be disposed between current carrier 510 and blast plate 520 such that an exterior side of each of battery cells 450 is not in contact with the exterior sides of other (e.g., adjacent) battery cells 450. In this way, coolant can circulate among and between battery cells 450 to provide submerged, evenly distributed cooling. In addition, to save the weight associated with coolant in areas where cooling is not needed, air pockets can be formed using channels craftily designed in space 530 between current carrier 510 and blast plate 520 not occupied by battery cells 450.

Coolant can enter half modules 410, 420 through coolant intake 540, be optionally directed by one or more flow channels, circulate among and between the plurality of battery cells 450, and exits through coolant outtake 550. In some embodiments, coolant intake 540 and coolant outtake 550 can each be male or female fluid fittings. In some embodiments, coolant or cooling fluid is at least one of: synthetic oil such as poly-alpha-olefin (or poly-α-olefin, abbreviated as PAO) oil, ethylene glycol and water, liquid dielectric cooling based on phase change, and the like. Compared to techniques using metal tubes to circulate coolant, submerged cooling improves a packing density of battery cells 450 (e.g., inside battery module 210 and half modules 410, 420) by 15%, in various embodiments.

Figure 6A:
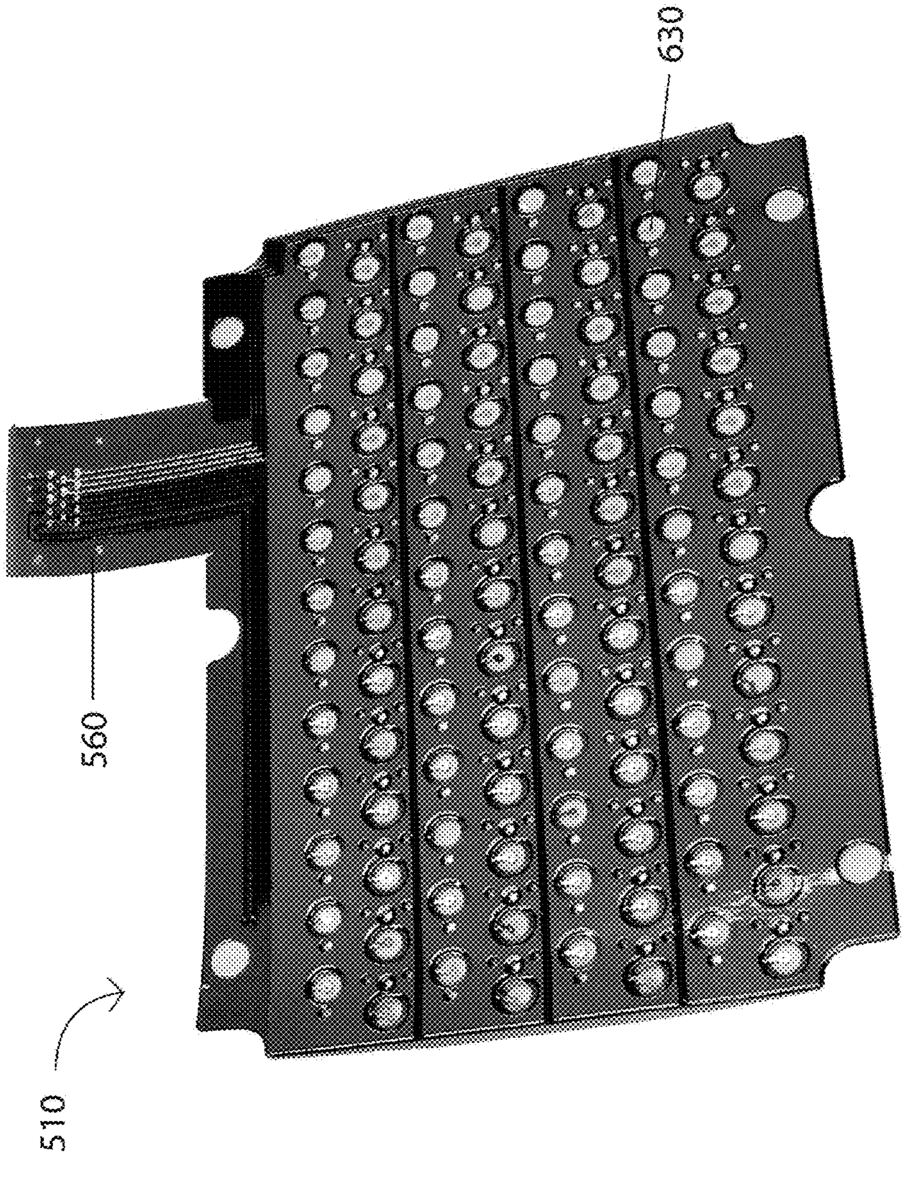
FIGS. 6A and 6B show a current carrier, according to various embodiments.
Figure 6B:
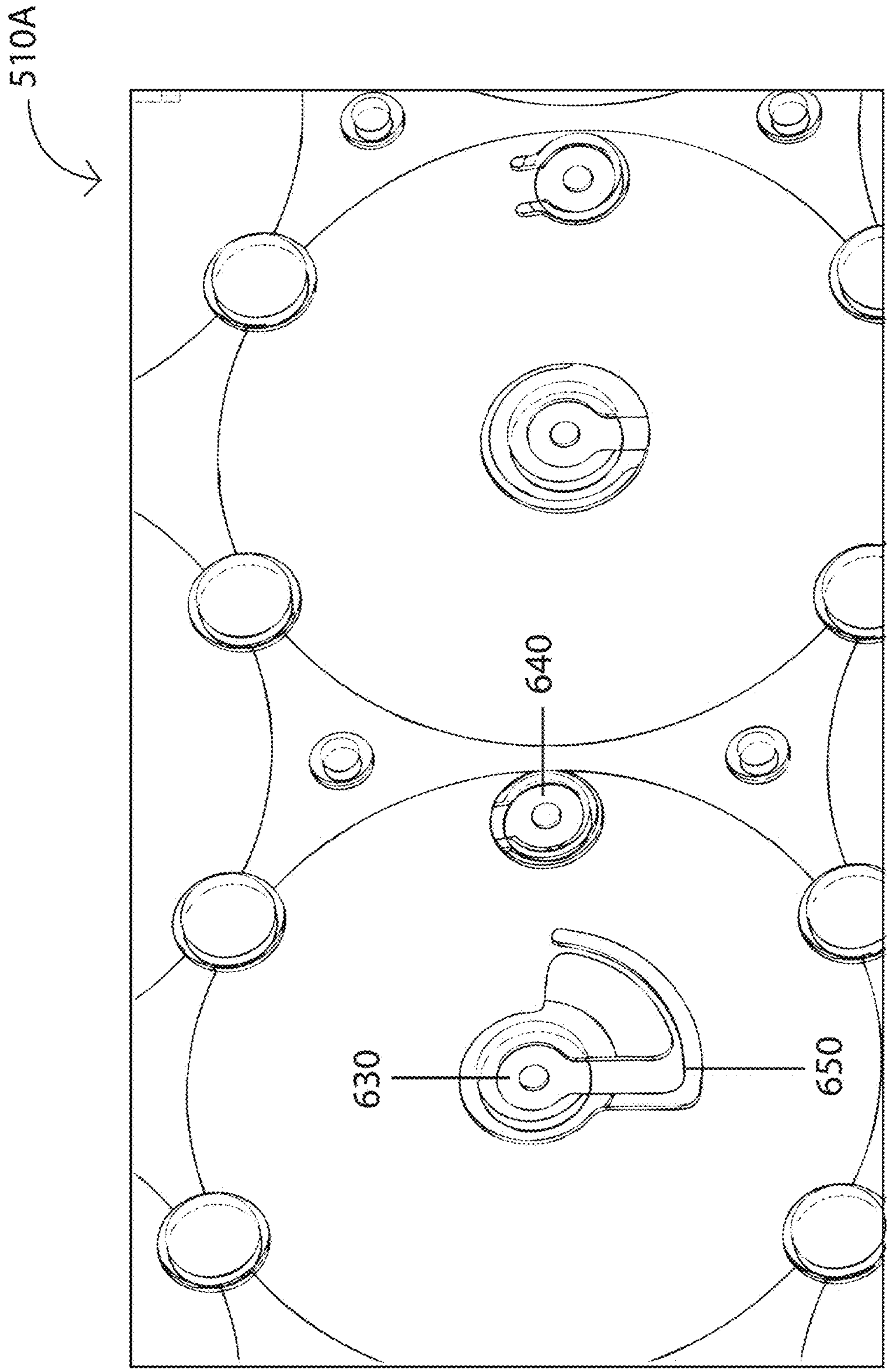

FIGS. 6A and 6B depict current carrier 510, 510A according to various embodiments. Current carrier 510, 510A can be generally flat (or planar) and can comprise one or more layers (not shown in FIGS. 6A and 6B), such as a base layer, a positive power plane, a negative power plane, and signal plane sandwiched in-between dielectric isolation layers (e.g., made of polyimide). In some embodiments, the signal plane can include signal traces and be used to provide battery module telemetry (e.g., battery cell voltage, current, state of charge, and temperature from optional sensors on current carrier 510) to outside of battery module 210.

As depicted in FIG. 6B, current carrier 510A can be a magnified view of a portion of current carrier 510, for illustrative purposes. Current carrier 510A can be communicatively coupled to each of battery cells 450, for example, at separate (fused) positive (+) portion 630 and separate negative (−) portion 640 which may be electrically coupled to the positive power plane and negative power plane (respectively) of current carrier 510A, and to each cathode and anode (respectively) of battery cell 450. In some embodiments, positive (+) portion 630 can be laser welded to a cathode terminal of battery cell 450, and negative (−) portion 640 can be laser welded to an anode terminal of battery cell 450. In some embodiments, the laser-welded connection can have on the order of 5 milli-Ohms resistance. In contrast, electrically coupling the elements using ultrasonic bonding of aluminum bond wires can have on the order of 10 milli-Ohms resistance. Laser welding advantageously can have lower resistance for greater power efficiency and take less time to perform than ultrasonic wire bonding, which can contribute to greater performance and manufacturing efficiency.

Current carrier 510A can include fuse 650 formed from part of a metal layer (e.g., copper, aluminum, etc.) of current carrier 510A, such as in the positive power plane. In some embodiments, fuse 650 can be formed (e.g., laser etched) in a metal layer (e.g., positive power plane) to dimensions corresponding to a type of low-resistance resistor and acts as a sacrificial device to provide overcurrent protection. For example, in the event of thermal runaway of one of battery cell 450 (e.g., due to an internal short circuit), the fuse may “blow,” breaking the electrical connection to battery cell 450 and electrically isolating battery cell 450 from current carrier 510A. Although an example of a fuse formed in the positive power plane was provided, a fuse may additionally or alternatively be a part of the negative power plane.

Additional thermal runaway control can be provided in various embodiments by scoring on end 740 (identified in FIG. 7) of battery cell 450. The scoring can promote rupturing to effect venting in the event of over pressure. In various embodiments, all battery cells 450 may be oriented to allow venting into blast plate 520 for both half modules.

In some embodiments, current carrier 510 can be comprised of a printed circuit board and a flexible printed circuit. For example, the printed circuit board may variously comprise at least one of copper, FR-2 (phenolic cotton paper), FR-3 (cotton paper and epoxy), FR-4 (woven glass and epoxy), FR-5 (woven glass and epoxy), FR-6 (matte glass and polyester), G-10 (woven glass and epoxy), CEM-1 (cotton paper and epoxy), CEM-2 (cotton paper and epoxy), CEM-3 (non-woven glass and epoxy), CEM-4 (woven glass and epoxy), and CEM-5 (woven glass and polyester). By way of further non-limiting example, the flexible printed circuit may comprise at least one of copper foil and a flexible polymer film, such as polyester (PET), polyimide (PI), polyethylene naphthalate (PEN), polyetherimide (PEI), along with various fluoropolymers (FEP), and copolymers.

In addition to electrically coupling battery cells 450 to each other (e.g., in series and/or parallel), current carrier 510 can provide electrical connectivity to outside of battery module 210, for example, through main power connector 460 (FIG. 4). Current carrier 510 may also include electrical interface 560 (FIGS. 5, 6A) which transports signals from the signal plane. Electrical interface 560 can include an electrical connector (not shown in FIG. 5, 6A).

Figure 7:
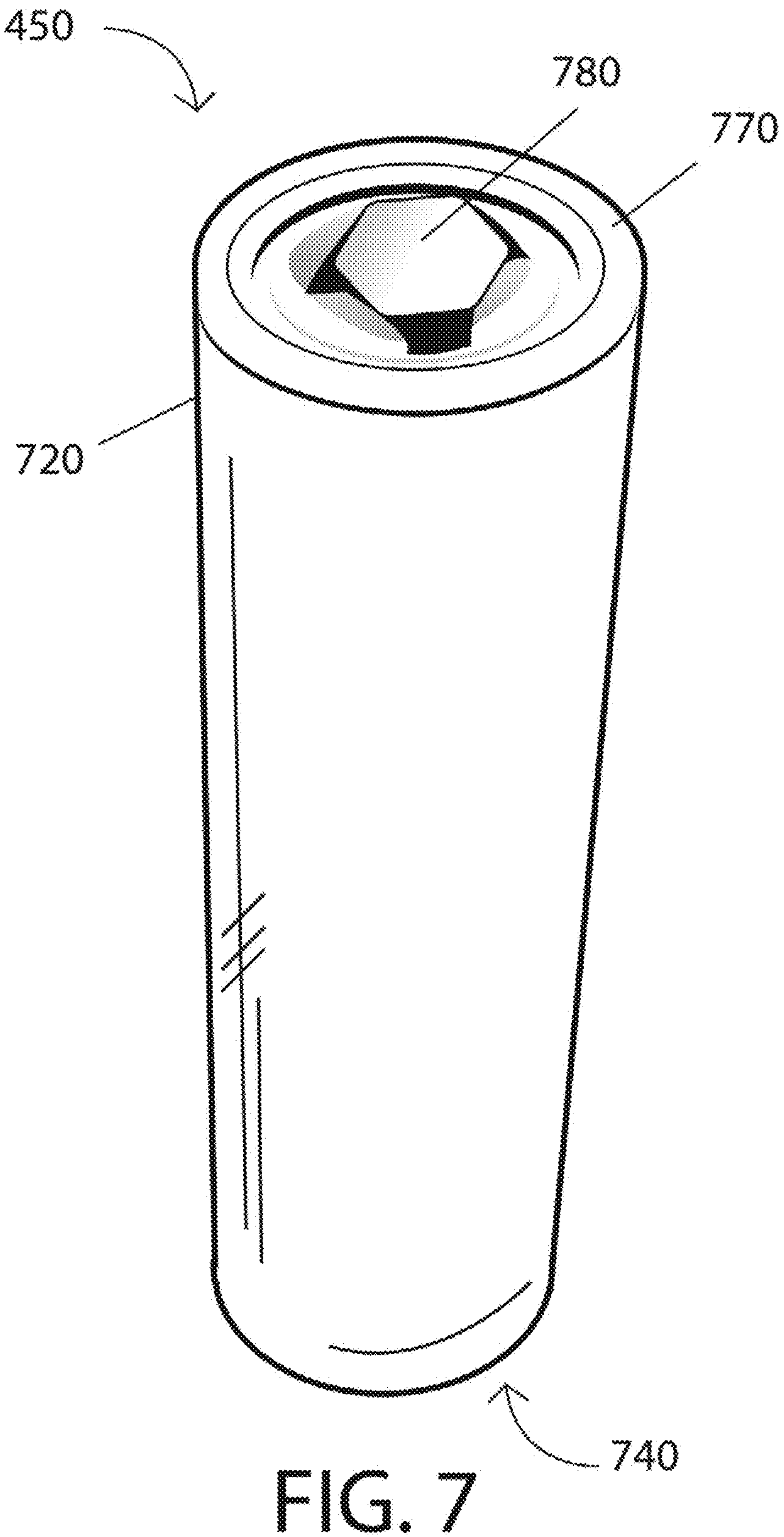
FIG. 7 depicts an example battery cell.

FIG. 7 shows battery cell 450 according to some embodiments. In some embodiments, battery cell 450 can be a lithium ion (li-ion) battery. For example, battery cell 450 may be an 18650 type li-ion battery having a cylindrical shape with an approximate diameter of 18.6 mm and approximate length of 65.2 mm. Other rechargeable battery form factors and chemistries can additionally or alternatively be used. In various embodiments, battery cell 450 may include can 720 (e.g., the cylindrical body), anode terminal 770, and cathode terminal 780. For example, anode terminal 770 can be a negative terminal of battery cell 450 and cathode terminal 780 can be a positive terminal of battery cell 450. Anode terminal 770 and cathode terminal 780 can be electrically isolated from each other by an insulator or dielectric.

Figure 8:
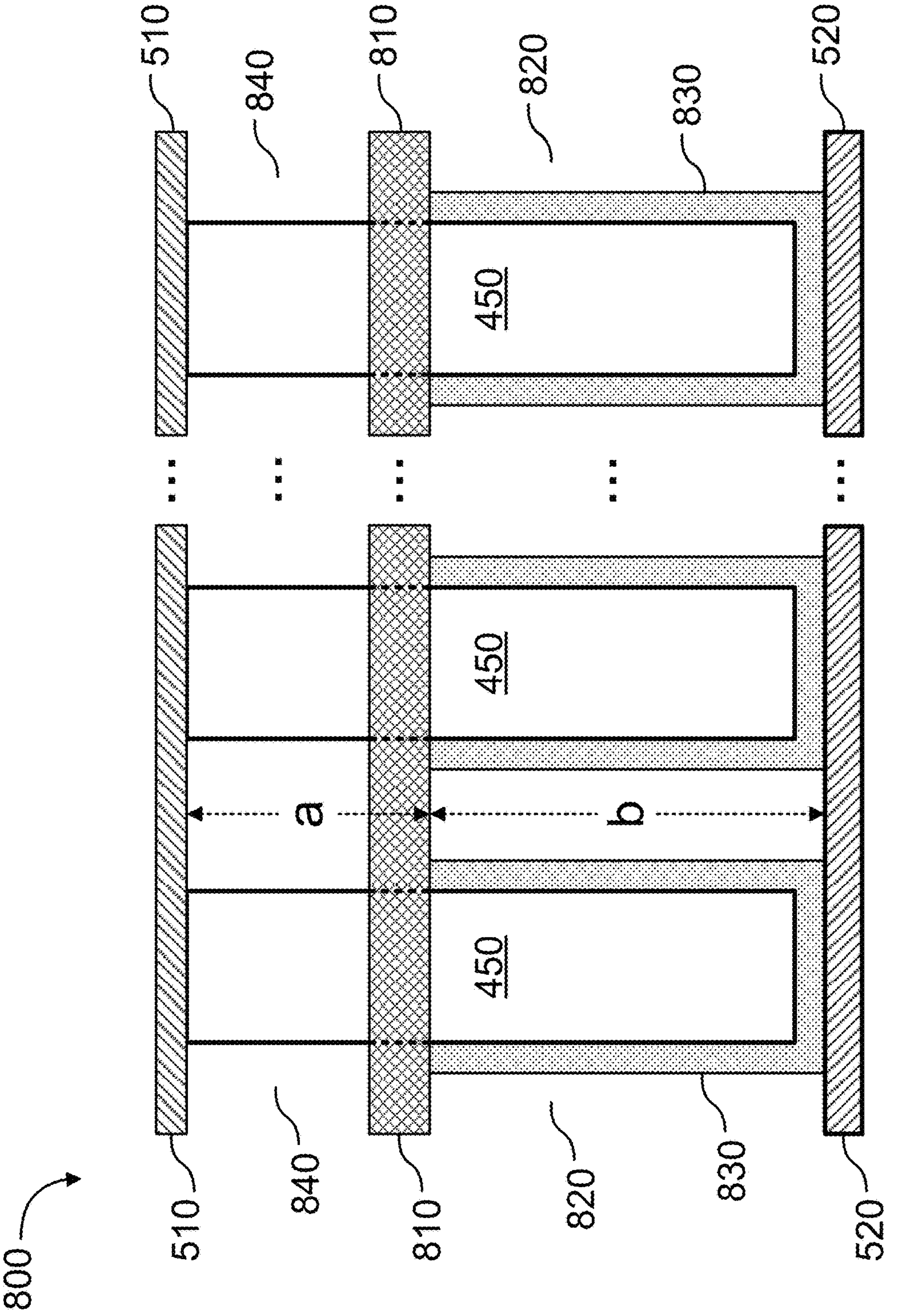
FIG. 8 illustrates further embodiments of a battery half-module.

FIG. 8 is a cross sectional view of half module 800 for illustrative purposes. In some embodiments, half module 800 can be half modules 410, 420 (FIG. 5). Half module 800 can comprise current carrier 510 (FIGS. 5, 6A, and 6B), blast plate 520 (FIG. 5), battery cells 450 (FIGS. 5 and 7), and retainer 810 disposed between current carrier 510 and blast plate 520.

Each of battery cells 450 can include an exterior surface having coating 830. A length of battery cells 450 having coating 830 can be denoted by reference character "b." Conversely, a length of battery cells 450 not having coating 830 can be denoted by reference character "a." For example, "b" can be in a range of 50%-90% of the length of battery cells 450. In some embodiments, coating 830 can be an electrical insulator providing (dielectric) isolation (e.g., extremely low electrical conductivity or high electrical resistance, such as a dielectric constant or relative permittivity (e.g., $\in$ or $\kappa$) less than 15 and/or a volume resistance greater than $10^{14}$ ohm·cm) between each of battery cells 450 (e.g., such that battery cells 450 do not short out). In various embodiments, coating 830 can additionally or alternatively provide high thermal conductivity (e.g., greater than 5 W/m·° K) to each of battery cells 450, which may facilitate transfer of heat from battery cells 450 to a fluid, such as a liquid coolant. For example, coating 830 may comprise one or more of aluminum oxide ($Al_2O_3$), diamond powder based materials, boron nitride (BN), and the like. By way of further non-limiting example, coating 830 can be applied to an exterior surface of battery cells 450 using at least one of: electrophoretic deposition (EPD) (e.g., electrocoating, e-coating, cathodic electrodeposition, anodic electrodeposition, and electrophoretic coating/painting), dipping, thermal spraying (e.g., plasma spraying), and the like.

In some embodiments, the exterior surface of battery cells 450 having coating 830 can be disposed in submersion area 820 of half module 800A, and submersion area 820 can have a liquid coolant disposed therein. In other words, a portion of battery cells 450 having coating 830 can be submerged in a liquid coolant. For example, submersion area can be a space or volume disposed between retainer 810 and blast plate 520. By way of further non-limiting example, the coolant can be ethylene glycol and water. In comparison to full submersion, partial submersion as illustrated in FIG. 8A can offer the advantages of lower weight, due at least in part to a lower volume of coolant in each half module 800A. Ethylene glycol can offer the advantage of higher heat/thermal capacity and transfer heat more efficiently, compared to some other coolants.

In some embodiments, the exterior surface of battery cells 450 not having coating 830 can be disposed in non-submersion area 840, and non-submersion area 840 may have a substance other than liquid coolant disposed therein (e.g., fluid such as air, which is substantially nitrogen gas (~78%) and oxygen gas (~21%)). In other words, a portion of battery cells 450 not having coating 830 may not be submerged in a liquid coolant. For example, non-submersion area can be a space or volume disposed between current carrier 510 and retainer 810.

Retainer 810 can hold battery cells 450 in a fixed position and separate submersion area 820 from non-submersion area 840. In various embodiments, submersion area 820 can be under pressure, for example, from (circulation) pumping the coolant. In some embodiments, the coolant pressure can be on the order of less than 5 pounds per square inch (PSI), for example, about 0.7 PSI.

Retainer 810 can form a seal (e.g., analogous to an o-ring) around a section or portion of battery cells 450 such that the coolant does not flow/move from submersion area 820 to non-submersion area 840. For example, retainer 810 can comprise an elastomer (e.g., rubber). In some embodiments, retainer 810 can be coupled to an exterior surface of battery cells 450 having coating 830, not having coating 830, or partially having coating 830 and partially not having coating 830.

Additionally or alternatively, a surface of retainer 810 in fluidic contact with non-submersion area 840 may be potted (e.g., filled with a solid or gelatinous compound (e.g., thermo-setting plastics, silicone rubber gels, etc. to exclude the coolant). In various embodiments, areas near and/or at where current carrier 510 can be electrically coupled to battery cells 450 can be potted (e.g., to prevent electrical shorts).

Figure 9:
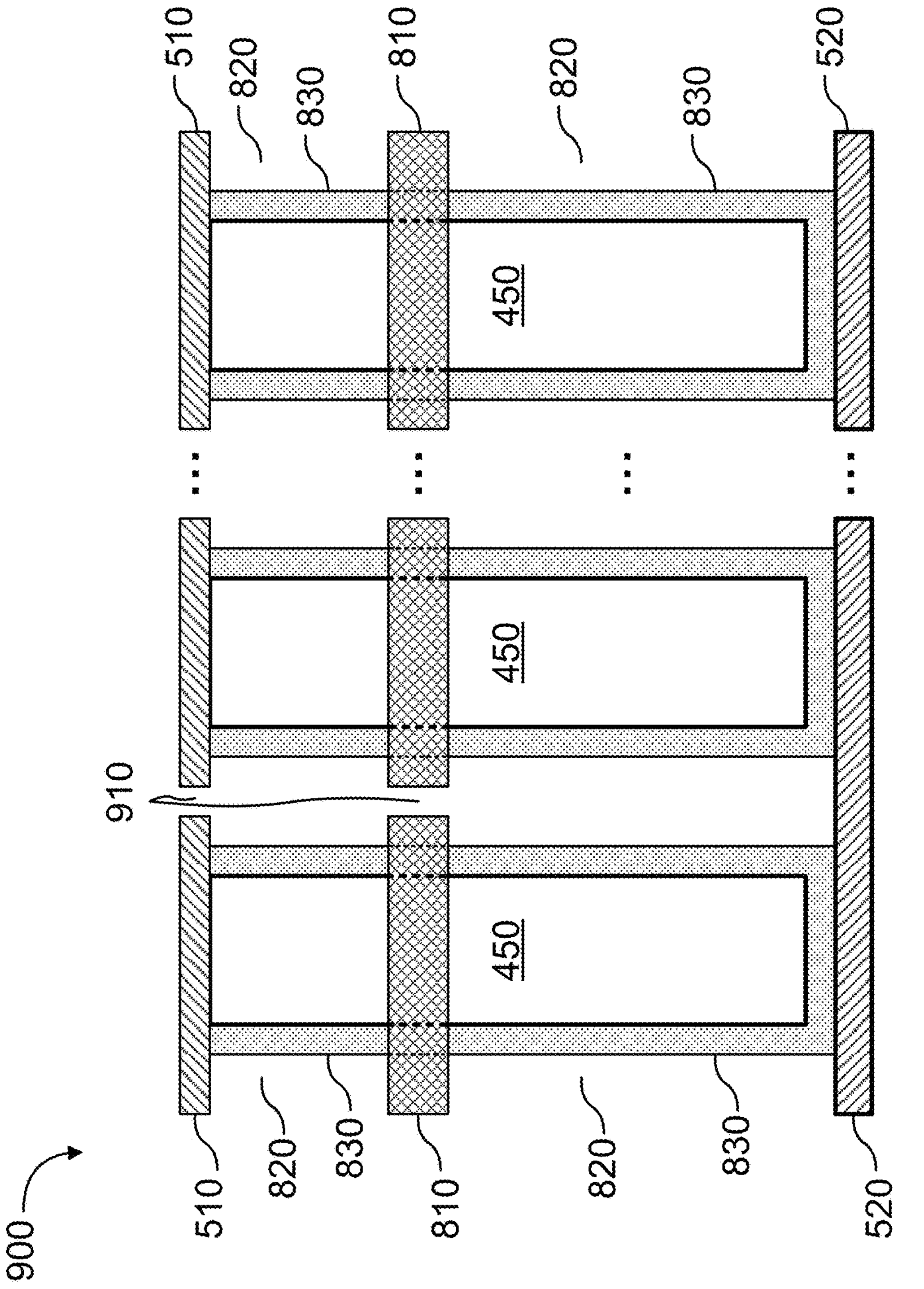
FIG. 9 illustrates additional embodiments of a battery half-module.

FIG. 9 is a cross sectional view of half module 900 for illustrative purposes. In some embodiments, half module 900 can be half modules 410, 420 (FIGS. 4 and 5). As shown in FIG. 9, an exterior surface of battery cells 450 (FIGS. 4, 5, 7, and 8) can be substantially fully covered by coating 830 (FIG. 8) (e.g., except near and/or at end 740 of battery cells 450 which includes cathode terminal 780 and anode terminal 770 (FIG. 7)). For example, submersion area 820 may run substantially the full length of battery cells 450. In other words, battery cells 450 are substantially fully submerged in the coolant (e.g., except near and/or at end 740 of battery cells 450). In some embodiments, the coolant substantially covers 98% of the battery cells 450. In another embodiment, the coolant substantially covers between 92% and 98% of the battery cells 450. In some embodiments, the coolant may flow/circulate through flow channels 910 in retainer 810 and/or current carrier 510 (FIGS. 5, 6A, and 6B (510A)). In various embodiments, areas—near where current carrier 510 can be electrically coupled to battery cells 450 and/or where current carrier 510 can be electrically coupled to battery cells 450—can be potted (e.g., filled with a solid or gelatinous compound, such as thermo-setting plastics, silicone rubber gels, etc., to exclude the coolant, to prevent electrical shorts, and the like).

As would be readily appreciated by one of ordinary skill in the art, various embodiments described herein may be used in additional applications, such as in energy-storage systems for wind and solar power generation. Other applications are also possible.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Exemplary embodiments were chosen and described in order to best explain the principles of the present disclosure and its practical application, and to enable others of ordinary skill in the art to understand the disclosure for various embodiments with various modifications as are suited to the particular use contemplated.

What is claimed is:

1. A energy-storage system comprising: a coolant section having a coolant circulated therein; a plurality of battery cells having a coated portion, the coated portion being disposed in the coolant section, wherein the coated portion is coated with a coating material comprising at least one of aluminum oxide, diamond powder based materials and boron nitride, the coolant section configured so that between 92% and 98% of the plurality of battery cells are substantially fully covered by the coolant; and a retainer disposed in the coolant section, the retainer holding the plurality of battery cells, the retainer having a plurality of flow channels, the coolant flowing through the flow channels.

2. The energy-storage system of claim 1, wherein the coolant substantially covers 98% of the battery cells.

3. The energy-storage system of claim 1, wherein the retainer comprises an elastomer.

4. The energy-storage system of claim 3 further comprising:

a current carrier electrically coupled to the plurality of battery cells, a cathode terminal of each of the battery cells being coupled to a respective positive contact of the current carrier, and an anode terminal of each of the battery cells being coupled to a respective negative contact of the current carrier.

5. The energy-storage system of claim 1, wherein at least one side of the retainer is potted.

6. The energy-storage system of claim 5, wherein the cathode terminal of each cell is laser welded to the respective positive contact of the current carrier and the anode terminal of each cell is laser welded to the respective negative contact of the current carrier.

7. The energy-storage system of claim 1, wherein the battery cells are cylindrical lithium-ion battery cells.

8. The energy-storage system of claim 7, wherein the current carrier includes a plurality of fuses each electrically coupled to the respective positive contact.

9. A energy-storage system comprising: a coolant section having a coolant circulated therein; a plurality of battery cells having a coated portion, the coated portion being disposed in the coolant section, wherein the coated portion is coated with a coating material comprising at least one of aluminum oxide, diamond powder based materials and boron nitride, the coolant section configured so that between 92% and 98% of the plurality of battery cells are substantially fully covered by the coolant; and a retainer disposed in the coolant section, the retainer holding the plurality of battery cells, the retainer having a plurality of flow channels, the coolant flowing through the flow channels, wherein the retainer comprises an elastomer.

10. The energy-storage system of claim 9, wherein the battery cells are cylindrical lithium-ion battery cells.

11. The energy-storage system of claim 9, wherein the coolant substantially covers 98% of the battery cells.

12. The energy-storage system of claim 9, wherein at least one side of the retainer is potted.

13. The energy-storage system of claim 12 further comprising:

a current carrier electrically coupled to the plurality of battery cells, a cathode terminal of each of the battery cells being coupled to a respective positive contact of the current carrier, and an anode terminal of each of the battery cells being coupled to a respective negative contact of the current carrier.

14. The energy-storage system of claim 13, wherein the cathode terminal of each cell is laser welded to the respective positive contact of the current carrier and the anode terminal of each cell is laser welded to the respective negative contact of the current carrier.

15. The energy-storage system of claim 14, wherein the current carrier includes a plurality of fuses each electrically coupled to the respective positive contact.

* * * * *